United States Patent
Papadimitriou et al.

(10) Patent No.: US 12,132,794 B2
(45) Date of Patent: Oct. 29, 2024

(54) METHOD AND SYSTEM FOR AUTOMATED PERSONALIZED MESSAGES AND PERSONALIZED EVACUATION GUIDELINES INDOORS OR OUTDOORS

(71) Applicant: ATOS Public Safety, LLC, Irving, TX (US)

(72) Inventors: Christina Papadimitriou, Nea Ionia (GR); Petra Stamou, Peania (GR); Foteini Andriopoulou, Patras (GR); Felina Sotiria Gogou, Peania (GR)

(73) Assignee: ATOS PUBLIC SAFETY

( * ) Notice: Subject to any disclaimer, the term of this patent is extended or adjusted under 35 U.S.C. 154(b) by 11 days.

(21) Appl. No.: 17/898,537

(22) Filed: Aug. 30, 2022

(65) Prior Publication Data

US 2023/0089682 A1    Mar. 23, 2023

(30) Foreign Application Priority Data

Sep. 22, 2021    (EP) .................................... 21198274

(51) Int. Cl.
| | |
|---|---|
| *H04L 67/52* | (2022.01) |
| *H04L 12/18* | (2006.01) |
| *H04L 51/18* | (2022.01) |
| *H04L 51/222* | (2022.01) |

(52) U.S. Cl.
CPC .......... *H04L 67/52* (2022.05); *H04L 12/1845* (2013.01); *H04L 51/18* (2013.01); *H04L 51/222* (2022.05)

(58) Field of Classification Search
CPC ..... H04L 67/52; H04L 12/1845; H04L 51/18; H04L 51/222; H04L 51/214; H04L 12/1895; H04L 67/535; H04W 4/02; H04W 4/021; H04W 4/023; H04W 4/024; H04W 4/025; H04W 4/029; H04W 4/33; H04W 4/90
See application file for complete search history.

(56) References Cited

U.S. PATENT DOCUMENTS

| | | | | |
|---|---|---|---|---|
| 2009/0138353 A1* | 5/2009 | Mendelson | ........... | G01S 5/0226 342/463 |
| 2009/0170467 A1* | 7/2009 | Nowlan | ................. | H04W 4/90 455/404.1 |
| 2009/0170468 A1* | 7/2009 | Kane | ...................... | G01G 21/20 455/404.2 |
| 2009/0170529 A1* | 7/2009 | Kane | ...................... | H04W 4/90 455/456.3 |
| 2015/0111523 A1* | 4/2015 | South | ..................... | H04W 4/90 455/404.2 |
| 2015/0348220 A1* | 12/2015 | Sharma | ............. | G01C 21/3407 705/324 |

(Continued)

OTHER PUBLICATIONS

European Search Report for EP21198274 dated Mar. 4, 2022.

*Primary Examiner* — Johnny B Aguiar
(74) *Attorney, Agent, or Firm* — MEAGHER EMANUEL LAKS GOLDBERG & LIAO, LLP

(57) ABSTRACT

A method and a system for automated personalized messages and personalized evacuation guidelines indoors or outdoors can be configured for providing automated personalized messages and/or personalized evacuation guidelines indoors or outdoors avoiding overcrowded routes adaptable to the user's special needs.

12 Claims, 10 Drawing Sheets

(56) References Cited

U.S. PATENT DOCUMENTS

| | | | |
|---|---|---|---|
| 2016/0183055 A1* | 6/2016 | Mahajan | H04W 4/025 |
| | | | 455/404.2 |
| 2016/0381537 A1* | 12/2016 | R | H04W 4/021 |
| | | | 455/404.1 |
| 2017/0111502 A1 | 4/2017 | Williams et al. | |
| 2017/0311131 A1* | 10/2017 | South | G01S 5/14 |
| 2019/0019379 A1* | 1/2019 | Beller | G09B 21/009 |
| 2019/0279327 A1 | 9/2019 | Braun et al. | |
| 2020/0175767 A1 | 6/2020 | Stivi et al. | |

\* cited by examiner

METHOD AND SYSTEM FOR AUTOMATED PERSONALIZED MESSAGES AND PERSONALIZED EVACUATION GUIDELINES INDOORS OR OUTDOORS

CROSS-REFERENCE TO RELATED APPLICATIONS

The present application claims priority to European Patent Application No. EP 21 198 274.9 filed on Sep. 22, 2021. The entirety of this European Patent application is incorporated by reference herein.

FIELD

The present invention relates to a method and a system for automated personalized messages and personalized evacuation guidelines indoors or outdoors. Embodiments of a system be configured for providing automated personalized messages and/or personalized evacuation guidelines indoors or outdoors for avoiding overcrowded routes adaptable to the user's special needs at a given period as well as a combination of these options is described, for example.

BACKGROUND

Currently, in case of emergency someone may receive a text notification triggered by governmental emergency mechanisms or being asked to evacuate a building relying on printed maps hanged on walls or on guidelines shouted out by others, which in case of persons with personalized needs may not be applicable and therefore the lack of being informed properly and in-time may be dangerous and crucial for their lives.

SUMMARY

We identified the following below simple scenarios that describe different situations which may occur during an emergency.

Scenario A: Imagine being a person with low vision and receiving a text message in your device (smartphone, mobile, Personal Computer (PC), notebook, laptop, etc.) informing of a current case of emergency. In case this person has not proactively configured their device to adapt to their disability/disabilities (i. e., setup a screen reader, activate extra accessibility settings, etc.), they may miss out critical information.

Scenario B: Imagine working in the office when an emergency arises (i. e., a fire has broken up somewhere in the building or an earthquake took place, etc.) and you need to evacuate the building in-time. Let's consider both the cases of a person in a wheelchair and a person with no mobility issues. It is obvious that not every emergency exit is suitable for every person. In some cases, a wheelchair user has to realize that a chosen way is not suitable for him/her, and he/she has to find another exit. This costs unnecessary time, which can have more serious consequences than if the wheelchair user had taken a suitable way out straight away.

Scenario C: Imagine being outdoor in a park on the outskirts of any city, when an emergency arises (i. e., fire in the forest nearby). A lack of local knowledge coupled with rising panic can also have considerable consequences here. Emergency personnel cannot always be on the site immediately to provide assistance and emergency exits. Therefore, the provision of personal evacuation options is of considerable importance.

In general, there are no systems that can automatically provide personalized broadcast messages and/or personalized evacuation guidelines, which can be beneficial to everyone and especially to people living with disabilities. Such systems can prove useful to inform citizens about an emergency and provide useful guidelines on how to evacuate an area based on their special needs (such as exits with ramps for people with wheelchairs).

Even though the governmental and non-governmental organizations are quick to report potential emergency events, these efforts often fail or are inadequate due to the lack of personalized information regarding the emergency event in correlation with the lack of providing evacuation guidelines to safely quit the area of disaster.

Currently, no solution exists that can customize and personalize the content that a particular person receives from an emergency alert system, and at the same time, provide personalized evacuation guidelines for this emergency event considering everyone's unique conditions (like impairment, temporary inability, etc.).

More specific, there are systems that broadcast fixed messages in case of an emergency incident. These systems are usually triggered by the governmental authorities and concern cases with impact on a wide number of citizens. However, in these cases they do not support any kind of personalization, excluding people with impairments to have equal access to information. Moreover, they do not offer any evacuation plan in order to leave the area of disaster.

On the other hand, there are systems that deal with providing evacuation guidelines in the context of a small area such as home exits or building's emergency exit if they exist. However, they do not support the evacuation of overcrowded buildings (an office building, a mall, a theater, etc.) and they are not implemented with a manner to consider each person's needs to support him/her to leave the area. Moreover, evacuating, or simple finding an exit route in an outdoor environment (city areas, parks on the outskirts of inhabited areas, remote parks, etc.) are cases where the support of emergencies is scarce.

An object we have identified for embodiments of our method and system is to provide a method and a corresponding system which overcomes the drawbacks described in the state of the art. In particular, which provides the possibility of automated personalized messages and personalized evacuation guidelines as well as the combination of these options taking into account the special needs of the person under emergency along with the environmental conditions.

A method for automated personalized messages and personalized evacuation guidelines indoors or outdoors, wherein the method using a system can include: (i) validating, by an event listener, a message about an event received from an enabler, (ii) processing, by an event parser, a forwarded message from the event listener, (iii) locating, by a request map component, users in the area of the event and retrieving maps that will be used to assist these users through a triggered action by the event parser, (iv) requesting, by a request user data component, user data either from a database of an external service or directly from a user's end device by a create URL component, (v) creating, by the create URL component, a Uniform Resource Locator (URL) which incorporates a method to deploy a software application on user's end device for retrieving data from the user's end device, (vi) encapsulating, by an enhanced message URL component, the created URL to the originating message and forwarding this enhanced message to a forward message and an encapsule URL component, (vii) forwarding, by the forward message and the encapsule URL component, the enhanced message to an outbound system at the users' side, (viii) generating and maintaining, by an app server service component, a data exchange between the system and the user's end device upon triggering by the enhanced message on the user's end device, (ix) storing, by the app server service component, received user data and/or user location data into a database and triggering data analysis by a data analysis component, (x) performing, by the data analysis component, data mining techniques and machine learning algorithms to classify the stored data and to deploy best fit evacuation models, (xi) generating, by a calculate personalized message component, an enhanced personalized message for the user regarding the results of the data analysis and the event data, (xii) selecting, by a select message media type component, a suitable message media type for the user regarding the needs of the user, (xiii) sending, by the personalized message component, the enhanced personalized message to the user upon triggering by the select message media type component, (xiv) calculating, by a calculate personalized evacuation routes component, personalized evacuation routes regarding the analyzed data and/or external data, (xv) choosing, by a choose best route per conditions component, an evacuation path for the user with a minimized risk to get harmed, (xvi) creating, by a create personalized instructions component, the most appropriate evacuation instructions for the user regarding the results of the previous step, and (xvii) sending, by a send personalized instructions component, the evacuation instructions to the user's device upon triggering by the select message media type component.

Some embodiments can utilize less than all of steps (i) through (xvii) and other can utilize additional steps as well as all or a combination of at least some of steps (i) through (xvii).

According to a preferred embodiment, the method can also include providing, by a request assistance component, a web interface to request assistance by the user and forwarding the request for assistance to an external service.

According to another preferred embodiment, the method can also include sending, by a notify user component, a notification to the user about the progress of the request for assistance upon triggering by the request assistance component.

According to still another preferred embodiment, the step of performing, by the data analysis component can include collecting all available data regarding user's location, indoor/outdoor maps, user's information and/or event information: exploring and evaluating the data: deploying evacuation models using clustering, regression and/or classification methods: selecting an evacuation model which fits best to the user's needs.

Further, according to a preferred embodiment, in the step of generating, by a calculate personalized message component, an enhanced personalized message for the user can include retrieving user and event data: identifying and classifying the data regarding the user's needs using algorithms based on machine learning techniques: generating a message optimized for the user's needs using a natural language processing (NLP) algorithm: enhancing the message with a URL allowing the user to interact with the system; and triggering the select message media type component.

According to yet another preferred embodiment, the step of calculating, by a calculate personalized evacuation routes component, personalized evacuation routes can include retrieving user and event data: identifying, if there is an ongoing or new evacuation request from the user, if yes, determining if the user has made a request for assistance, if yes, triggering the request assistance component: otherwise calculating the deviation of the user's location from the already proposed evacuation route, if the calculated deviation does not exceed a predefined threshold, then updating the available evacuation routes by the system and triggering the create personalized instructions component: otherwise, if the calculated deviation is above the predefined threshold or if there is a new evacuation request: calculating, by the system all available evacuation routes: executing, by the system, an evacuation and risk assessment to grade the risk of the available routes using artificial intelligence and predictive algorithms: filtering out overcrowded and unsuited routes using rule-based algorithms: forwarding and triggering the choose best route per condition component with the results.

According to yet another preferred embodiment, after receiving, by the user's end device, the enhanced message, the method can also include checking, by the user's end device, if silent software application installation is permitted by the user's end device policies; if yes, activating, the URL and deploying the software application which implements a Package Manager/Query-API (Application Programming Interface) Package-like class in order to retrieve various kinds of information related to application packages that have been installed on the users' end device and settings and opening a communication between the user's end device and the app server service component: scanning, by the software application, the user's end device: collecting, all applications that have been installed by the user as well as the configured end device settings: sending these aggregated data to the app server service component; and deactivating the URL and terminating the communication with the app server service component.

According to yet another preferred embodiment, wherein in case silent software application installation is not permitted by the user's end device the method further comprising: building and serving, by the app server service component, a web-based application providing the ability to the user to add more information related to their needs or profile voluntarily.

According to yet another preferred embodiment, the enabler comprises one of smart device, IoT (Internet of Thing) devices, Quick Response (QR) code detector or messages from external services or central authorities.

A system for automated personalized messages and personalized evacuation guidelines indoors or outdoors is also provided. Embodiments of the system can be configured to perform any of the above noted embodiments of the method.

According to a preferred embodiment, wherein the system comprises an internal system, an inbound system and/or an outbound system.

According to another preferred embodiment, wherein the internal system comprises at least one or more of an event listener, a parse event, a request map component, a request user data component, a create URL component, an enhanced message with URL component, a forward message & encapsulated URL component, an app server service component, a user data and user location data database, a data analysis component, a calculate personalized message component, a select message media type component, a send personalized message component, a calculate personalized evacuation routes component, a choose best route per conditions component, a create personalized instructions component, a send personalized instructions component, a request assistant component or a notify user component.

According to still another preferred embodiment, wherein the inbound system and/or the outbound system comprises at least one of one or more enabler, one or more user end device, one or more Telecommunication Service Providers (TSP), one or more external services, or one or more authorities or services able to transmit different events and/or one or more external database.

Embodiments of the system and method can offer a plurality of advantages. For example, the system and method offer personalization (both in messages and instructions). Further, there is no dependency on other apps/services and no need to install anything on the user's device by the user itself. It is a system and method covering a full solution no matter of:
- the output (message, instructions, etc.)
- the environment (indoor, outdoor)
- the conditions (fire, earthquake, etc.)
- the temporary user conditions (a pregnant woman, a man with a broken leg, etc.)
- user's intervention (triggered automatically by emergency incidents).

Thereby, embodiments can provide personalized message content (addressing cognitive issues, etc.), is automated and adaptable to any incident (earthquake, emergency in a mall, etc.), any organizations (governmental i. e., emergency alert mechanisms, malls, theater, office buildings, etc.) and/or any place (indoors, outdoors, near, or far away of inhabited areas, etc.).

Embodiments can utilize unique and several ways to identify the personal needs (temporary or permanent) like data taken from a system (i. e., company employee data, etc.), data found in external resources (i. e., citizen info in the public health system, etc.) and/or user's device settings, activated configuration parameters, installed apps, etc.

It has also to be noted that aspects of the invention have been described with reference to different subject-matters. In particular, some aspects have been described with reference to apparatus or system type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus or system type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
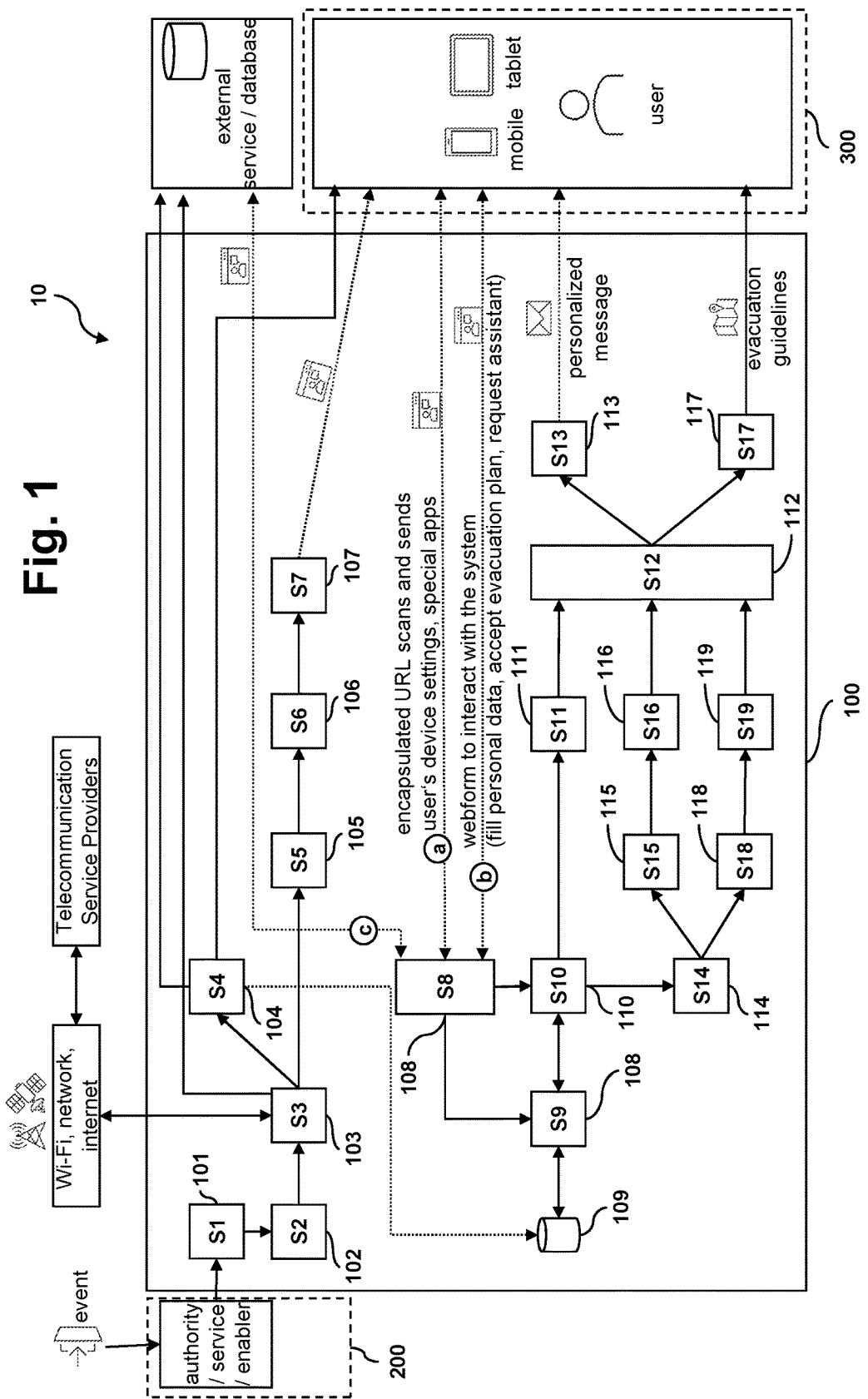
FIG. 1 shows a schematic illustration of the system and method steps according to an embodiment of the invention.

The illustration in the drawings is schematic and may be not to scale. Reference numerals used in the drawings include:
- 10 system
- 100 internal system
- 101 event listener
- 102 parse event
- 103 request map component
- 104 request user data component
- 105 create URL component
- 106 enhanced message with URL component
- 107 forward message and encapsulated URL component
- 108 app server service component
- 109 internal database
- 110 data analysis component
- 111 calculate personalized message component
- 112 select message media type component
- 113 send personalized message component
- 114 calculate personalized evacuation routes component
- 115 choose best route per conditions component
- 116 create personalized instructions component
- 117 send personalized instructions component
- 118 request assistant component
- 119 notify user component
- 200 inbound system
- 300 outbound system
- S1-S19 method step 1-19

DETAILED DESCRIPTION

FIG. 1 shows a system and method steps according to an embodiment of the invention. The system 10 in turn comprises various sub-systems 100, 200, 300 with unique endpoints for the inbound and the outbound messages. As will be understood in the art, and with reference to FIGS. 1, 6, and 7, each subsystem in system (100) (e.g., subsystems 101-108, and 110-119) may be performed by one or more processors operably coupled to a non-transitory computer readable storage medium (e.g., internal database 109, or an external database). Whenever messages either from enablers (i. e., IoT (Internet of Things) devices, QR detectors, etc.) or messages from external services and central authorities trigger the system 10, an inbound system 200 comprising inbound endpoints activates an event listener 101.

The event listener 101 can be a server permanently 'alive' and ready to accept messages. It can be triggered by a set of different types of enablers (i. e., IoT (Internet of Things) devices, QR detectors, etc.) or messages from external services and central authorities. The event listener 101 checks the validity of the message and if it is not certified as valid, informs the sender (enabler) of the message about the cause of the failure. Otherwise, it automatically forwards the message to an event parser 102.

The event parser 102 receives message from the event listener 101 and checks the resource and the type of the message as, for example, if it is an emergency message to be forwarded or an action to recognize the location of a user. The event parser 102 stores temporarily the incoming message for security and recovery purposes until the session is released/completed. For this purpose, the event parser 102 may comprise a dedicated memory or storage.

The event parser 102 can trigger a so-called request map component 103 of the system. The request map 103 has two main purposes, to find the users in the specific location and to retrieve the maps that will be used to assist the users. To do so, it is supplied by the event parser 102 with the location data of the event as parameter and then it communicates with the local Telecommunication Service Providers (TSPs) to retrieve the users located in the area. Moreover, it retrieves every geographical information that is available from either a third-party application or by internal and/or external databases.

A request user data component 104 retrieves the user's data either stored in a database or directly from the end user's device exploiting the functionality of a create URL component 105. The first procedure requires a proactive action from the user that will allow their data from a third-party application to be used. In this case, the request user data component 104 sends a request to the external service querying for the data. In the other case, the request user data component 104 triggers the create URL component 105 which will initiate the process of retrieving data from end user's device.

The create URL component 105 can incorporate a method that deploys a software application. This application implements a Package Manager/Query-API Package-like class in order to retrieve various kinds of information related to the application packages that have been installed on the users' device and settings. Upon the execution of the software program, it scans the users' end device to retrieve a list of the applications that have been installed by the user as well as the configured device settings i. e., fonts, level of sound, accessibility settings, etc. In case we refer to people with vision impairment, there are software applications like screen readers and Braille based applications that may be installed to assist them.

An enhanced message with URL component 106 is responsible for the encapsulation of the created URL to the originating messages' payload. The originating message is enhanced and extended with the composed URL. Then, it is forwarded to a Forward (Fwd-)message & encapsule URL component 107. The Fwd. message & encapsule URL component 107 forwards the enhanced message to an outbound system in more detail to an outbound endpoint at the end users' side.

An app server service component 108 which can be a middle tier server that maintains an active communication channel between the system and the outbound endpoint located at the end users' side and also with the external services. It is responsible for receiving information related to the users' profile, maps and location data from the external services (c) as well as the list of the installed applications and settings gathered from the proposed software application (a, b). The app server service component 108 can store aggregated information of user data and user location data to the internal database 109.

The internal database 109 comprises all current and archived information of user and location gathered via the app server service component 108 such as maps, profile data, user preferences and needs, historical data, etc. This type of information is known as primitive context information and is going to be used by a data analysis module or component 110. The internal database 109 is updated when new or updated data reach the app server service component 108.

Upon the update or initiation of an event, the data analysis component 110 is triggered to proceed with the process and evaluation of the data. The data analysis component 110 has a twofold purpose. In the first phase, data mining techniques are used to derive knowledge from the stored data in the internal database 109. The second phase relates to applying machine learning algorithms to classify the data and deploy the models that are going to predict the system's mode, forecast whether the broadcast or the evacuation mechanism best fits each scenario, as presented in more detail in FIG. 3.

After the data analysis, a calculate personalized message component 111 retrieves the event information and all user's labels provided by the data analysis component 110. This information is used as an input to an algorithm based on machine learning techniques which identifies and classifies the user needs. At the end of this process, an optimal message taking into account all the categories to which the user belongs is created. Finally, the message is enhanced with a URL allowing the user to interact with the system. This process is presented in more detail in FIG. 4.

Hereafter, a select message media type component 112 receives the enhanced personalized message from the calculate personalized message component 111 and any other information related to the user's needs (i. e., visual, hearing, etc.). Based on this information, a classifier algorithm selects the best message type for each user. After the user's classification, the message will be converted into the appropriate format which can be better interpreted by the user. For example, an audio and text format are selected and provided to an elderly person.

A send personalized message component 113 which can be a sender upon triggering by the select message media type component 112 sends the message to the user using for example the local TSPs.

After the data analysis is completed, not only the calculate personalized message but also a calculate personalized evacuation routes component 114 retrieves the event information and all user's labels provided by the data analysis component 110. This information is used as an input to an algorithm based on machine learning techniques to identify if there is an ongoing or new evacuation request for the current user. In case of an ongoing evacuation request, the algorithm determines if the user has made a request for assistance. If it receives a positive response, the request assistant component 118 is triggered. Otherwise, the system calculates the available evacuation paths/routes and triggers a create personalized instructions component 116 if the deviation levels of the routes are acceptable. If not, a choose best route per conditions component 115 is triggered. For a detailed view of these processes see FIG. 5.

The choose best route per conditions component 115 exploits decision tree algorithms to provide an effective method for deciding which path is the best for each user from a set of paths calculated by the calculate personalized evacuation routes component 114. The algorithm takes into account the overall picture of each case with all the factors that affect it, for example, other users in the area or the latest event updates. The output is the selection of the most appropriate route based on user's needs minimizing the risk.

The create personalized instructions component 116 implements the same methodology as the calculate personalized message component 111. The create personalized instructions component 116 uses as input the best evacuation route for the given user and any information that is related to the user's needs (i. e., cognitive impairments). This information is provided to a machine learning algorithm which analyzes and determines the best way in which the user can assimilate information. The result of this algorithm is utilized to generate evacuation instructions. The content of the instructions is formed using Natural Language Processing (NLP) techniques. NLP exploits syntax and semantics ontologies to perform verbal, realistic and grammatical analysis in order to create the most appropriate instructions for the user.

A send personalized instructions component 117 is triggered by the select message media type component 112 and sends the evacuation guidelines to the user.

The system 10 can also provide a web interface to enable users to request assistance whenever needed via their user device (e.g. a smart phone, tablet, laptop computer, etc.). The request assistant component 118 receives this request and forwards it to the external service and triggers the notify user component 119. Finally, if the user is subjected to the request assistant component 118, then a notification is sent (notify user) to inform the user about the progress of his/her request.

Figure 2:
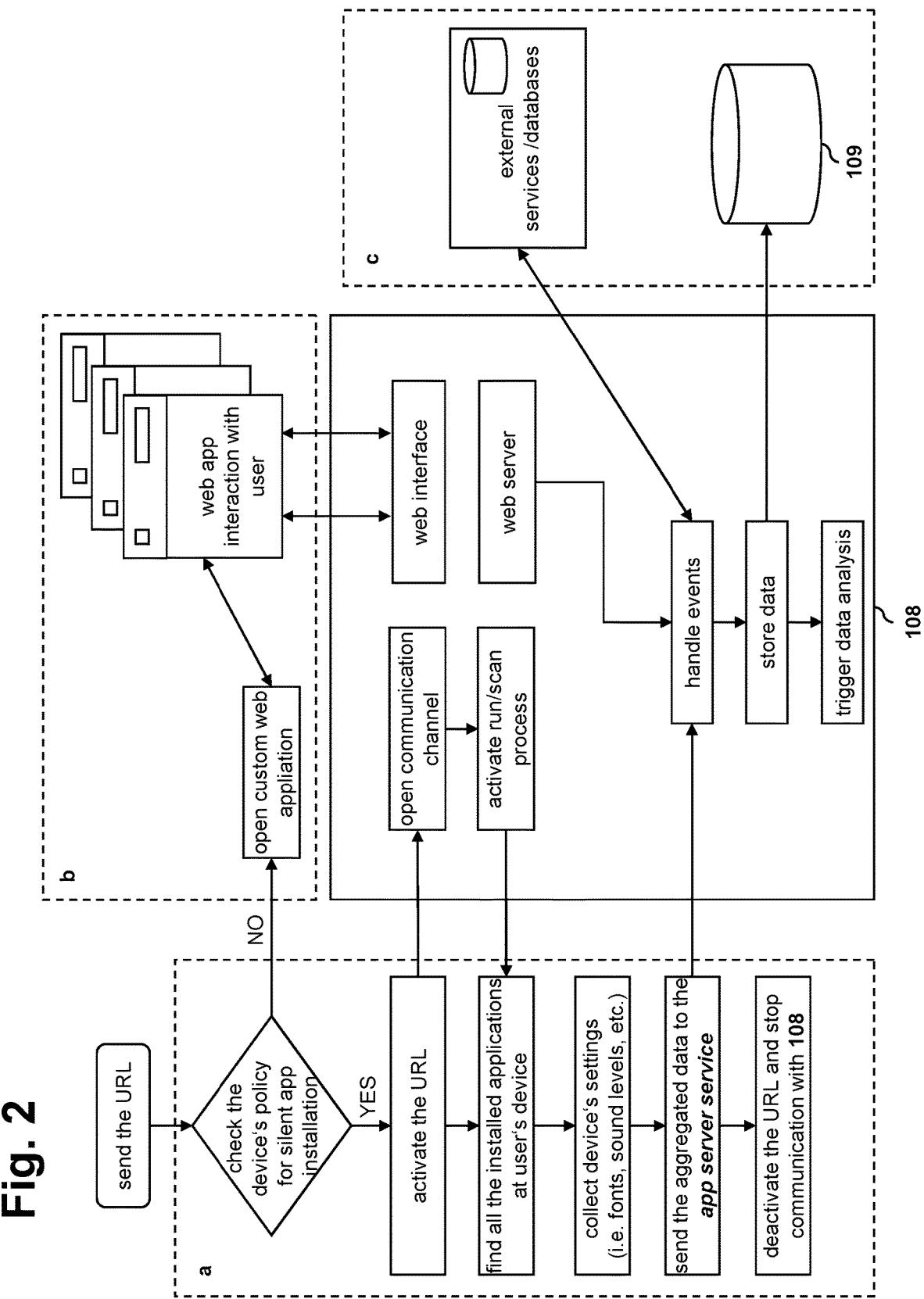
FIG. 2 shows a flowchart of the method regarding the app server service component architecture according to another embodiment of the invention.

In FIG. 2 the app server service component 108 architecture according to another embodiment of the invention is depicted. As mentioned, the app server service component 108 is a middle tier server that maintains an active communication channel between the system and the outbound systems. In this particular case, the outbound system is located at the end users' side and at external service side. The app server service component 108 is responsible for receiving information related to the users' profile, maps and location data from the external services (c) as well as a list of the installed applications and settings gathered from the software application (a, b) presented in FIG. 2. When the enhanced message reaches the user's end device (e.g. smartphone, tablet, laptop computer, etc.), the software attempts to open the URL based on the device's URL policy (a). If it is permitted to silently install applications and run software, it activates the URL.

At the app server service component 108, the software program, implements methods that interact with the user's device so as to silently install and activate the application and collect the installed applications and user's settings at the device side (a). In case it is not permitted to open the URL, then app server service component 108 can build and serve a web-based application (b) providing the ability to the end users to add more information related to their needs or profile voluntarily (b). Assuming someone has a broken leg or is pregnant and requests a personal assistant to evacuate the area. Then, the app server service component 108 stores all the aggregated information at the user data as well as the user location data in the database. Upon the update or initiation of an event, it triggers the data analysis component 110 to proceed with the process and the evaluation of the data.

Figure 3:
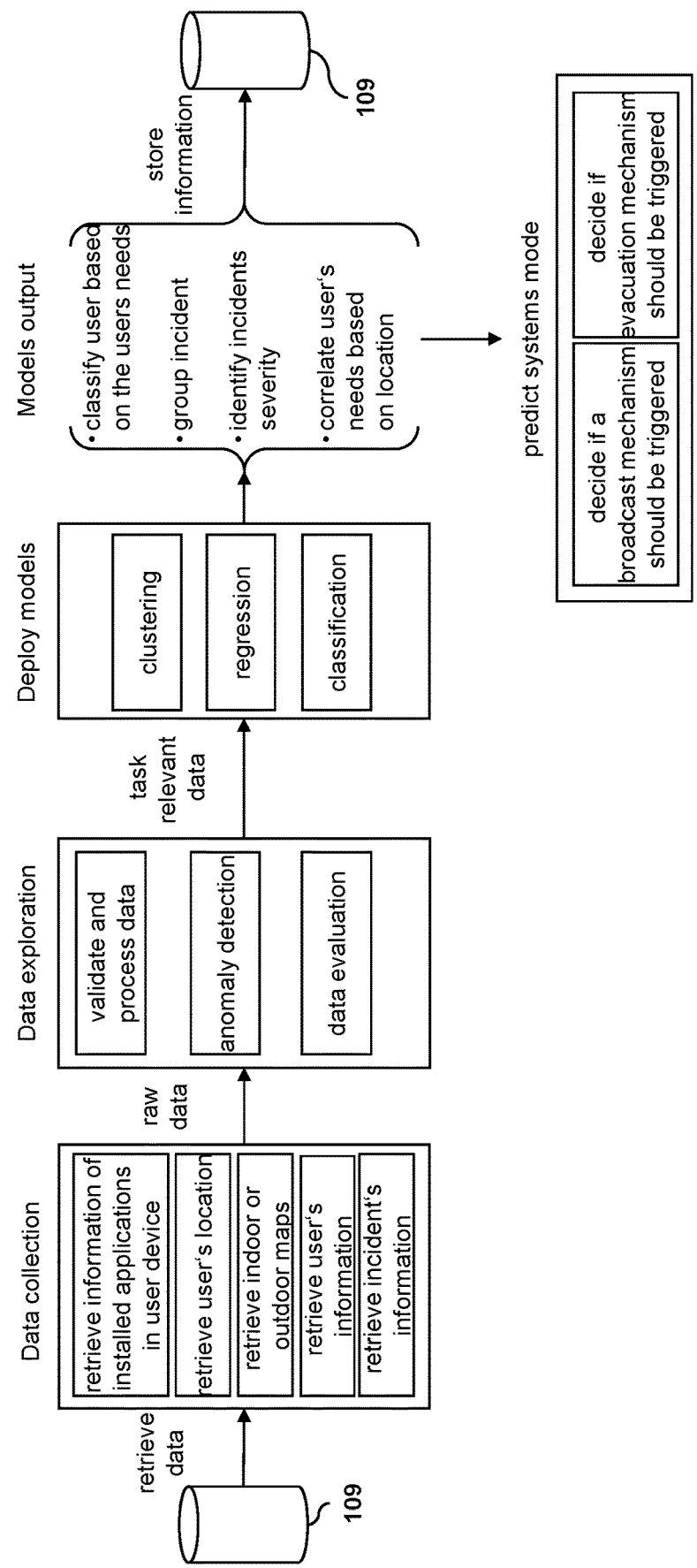
FIG. 3 shows in a flow diagram the data analysis of the method according to another embodiment of the invention.

FIG. 3 gives a deeper view in the data analysis techniques which could be applied for the invention. The data analysis component has a twofold purpose. At first phase, data mining techniques are used to derive knowledge from the stored data in the internal database 109. The second phase relates to applying machine learning algorithms to classify the data and deploy the models that are going to predict the system's mode, forecast whether the broadcast or the evacuation mechanism best fits each scenario, as presented in FIG. 3. More specific, data analysis retrieves all the available data from the internal database or data collection 109. This data contains information about the user's location, the available maps based on the user's location, a list of the installed applications in the user's end device and any possible physical or cognitive impairment that the user may have. Moreover, it includes information about the incident related to the current user that triggered the system. Then, the analysis, purification and verification of the data (data exploration) is performed in order to prepare the data that is going to be used by the data mining models. During this process, the data is evaluated/explored in order to identify abnormal data, known as outliers, that may adversely affect the accuracy of the models. After extracting all the information, a combination of classification and clustering algorithms is used to (i) categorize the user based on his/her needs,
(ii) identify any underline patterns and correlations between the user's needs and the user's current location, and
(iii) identify the severity of the emergency incident (deploy models).

This information is also going to be used from the systems' components to take informed decisions so as to create personalized evacuation instructions or broadcast messages. Moreover, machine learning methods identify how the type of the incident may affect the user depending on their location and impairments. The output of all these models is utilized to predict whether the system should serve as a personalized emergency or evacuation system (predict system's mode).

Figure 4:
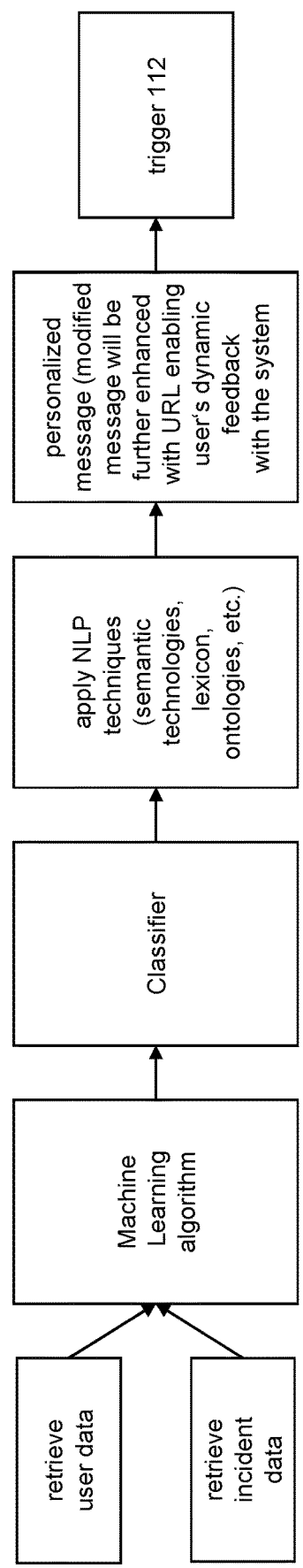
FIG. 4 shows in a flow diagram the personalized message calculation of the method according to another embodiment of the invention.

In FIG. 4 the process of personalized message calculation of the method according to another embodiment of the invention is presented in deeper detail. The calculate personalized message component 111 retrieves the event information and all user's labels provided by the data analysis. This information is used as an input to an algorithm based on machine learning techniques which identifies and classifies the user needs. A classifier consumes the output of this algorithm to group the user to categories with specific content requirements from the message. Then, a Natural Language Processing (NLP) algorithm generates the optimal message taking into account all the categories to which the user belongs. Finally, the message is enhanced with a URL allowing the user to interact with the system. For example, let's assume that the user belongs to the Asperger spectrum, or the user is too young to understand complex instructions. This information is transmitted to an algorithm to identify and classify the user in order to transform the content of the message to a comprehensible format and structure.

Figure 5:
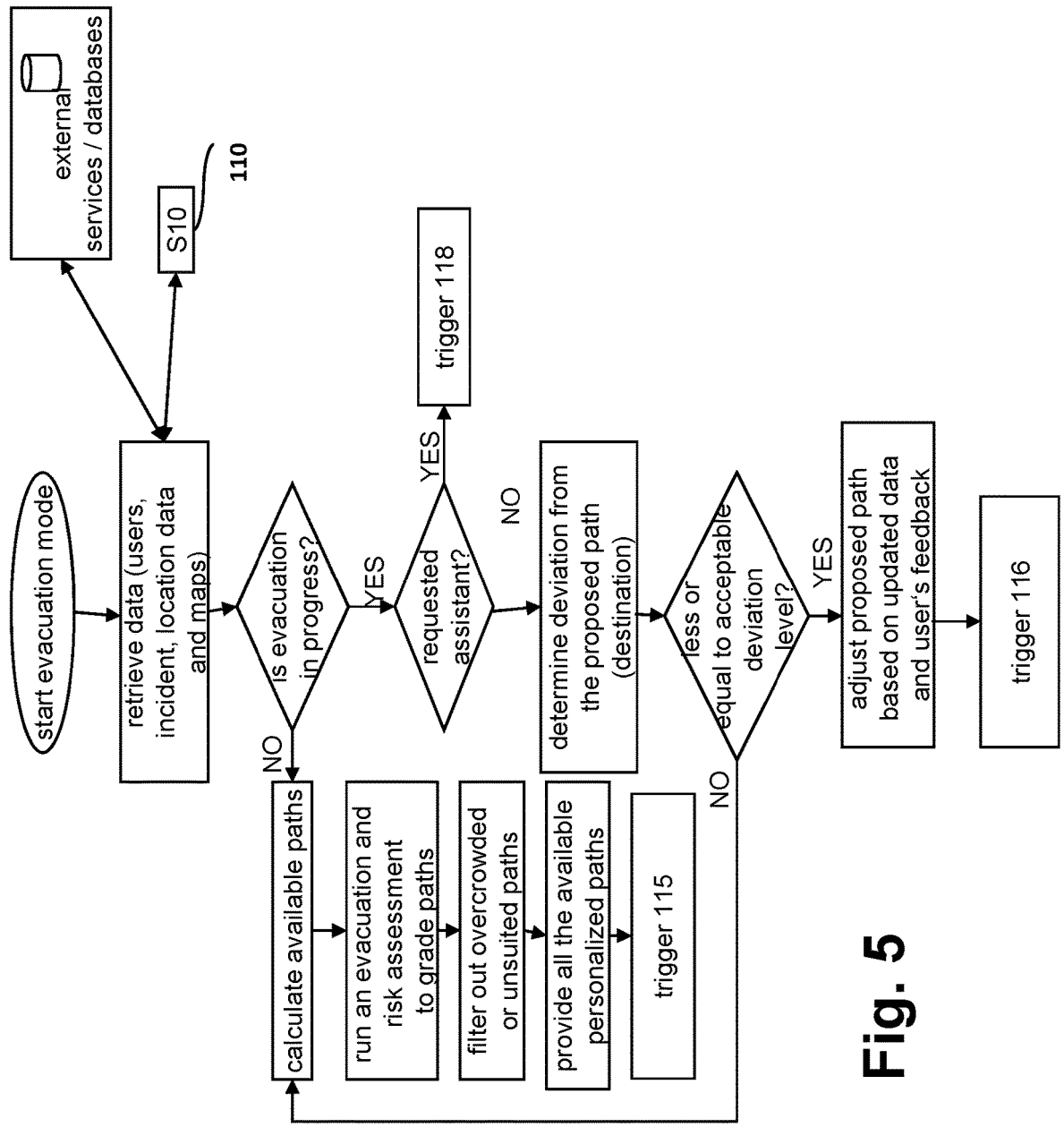
FIG. 5 shows in a flow diagram the personalized evacuation routes calculation of method according to another embodiment of the invention.

FIG. 5 shows in a flow diagram, in more detail, the process of personalized evacuation routes calculation of the method according to another embodiment of the invention. The calculate personalized evacuation routes component 114 retrieves the event information and all user's labels provided by the data analysis component 110. This information is used as an input to an algorithm based on machine learning techniques to identify if there is an ongoing or new evacuation request for the current user. In case of an ongoing evacuation request, the algorithm determines if the user has made a request for assistance via the user's end device. If it receives a positive response, the request assistant component 118 is triggered. Otherwise, the system calculates the deviation of the user's position from the already proposed route. If the calculated deviation does not exceed the predefined threshold, then the system updates the available evacuation paths and triggers the create personalized instructions component 116. On the other hand, when the calculated deviation is above the predefined threshold or there is a new evacuation request, the system calculates all the available evacuation paths. Then, based on artificial intelligence and predictive algorithms, the system executes an evacuation and risk assessment to grade the risk of the available routes. Rule-based algorithms and decision trees are used to filter out overcrowded and unsuited paths. The output of this process contains a set of the candidate paths which are forwarded to the choose best route per conditions component 115.

Figure 6:
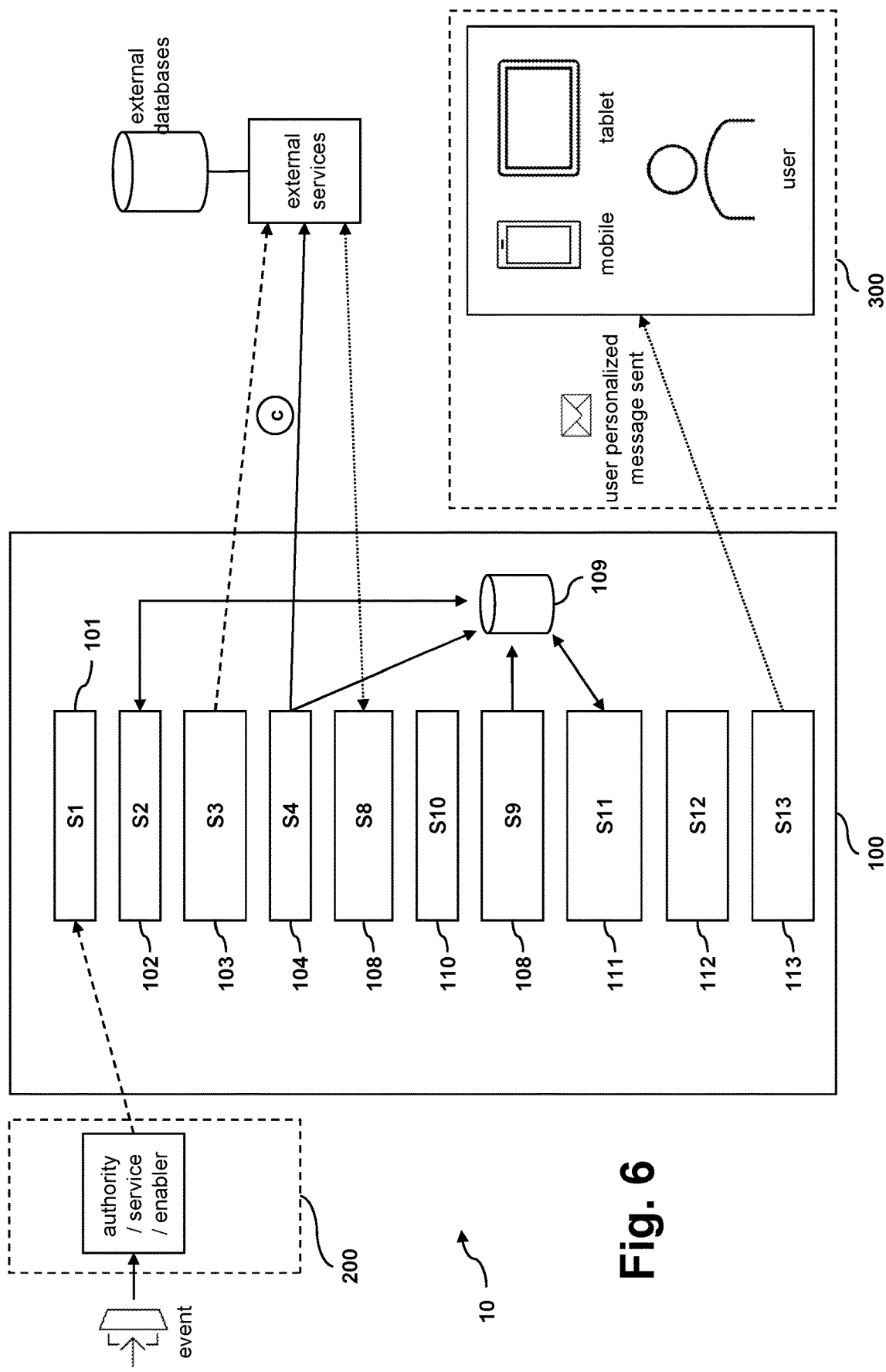
FIG. 6 shows a schematic illustration of the system and method steps regarding personalized messages of type A according to an embodiment of the invention.
Figure 7:
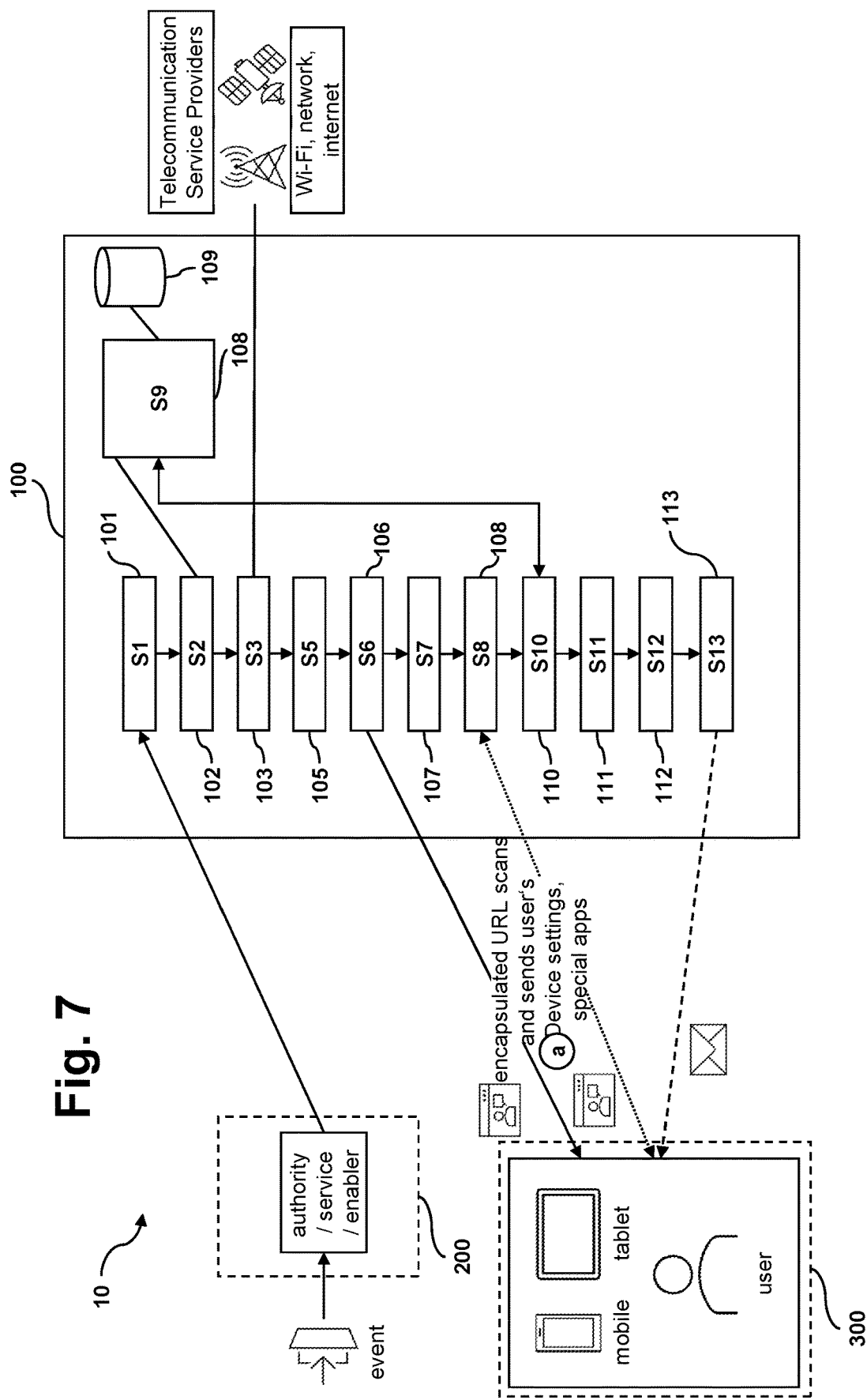
FIG. 7 shows a schematic illustration of the system and method steps regarding personalized messages of type B according to an embodiment of the invention.
Figure 8:
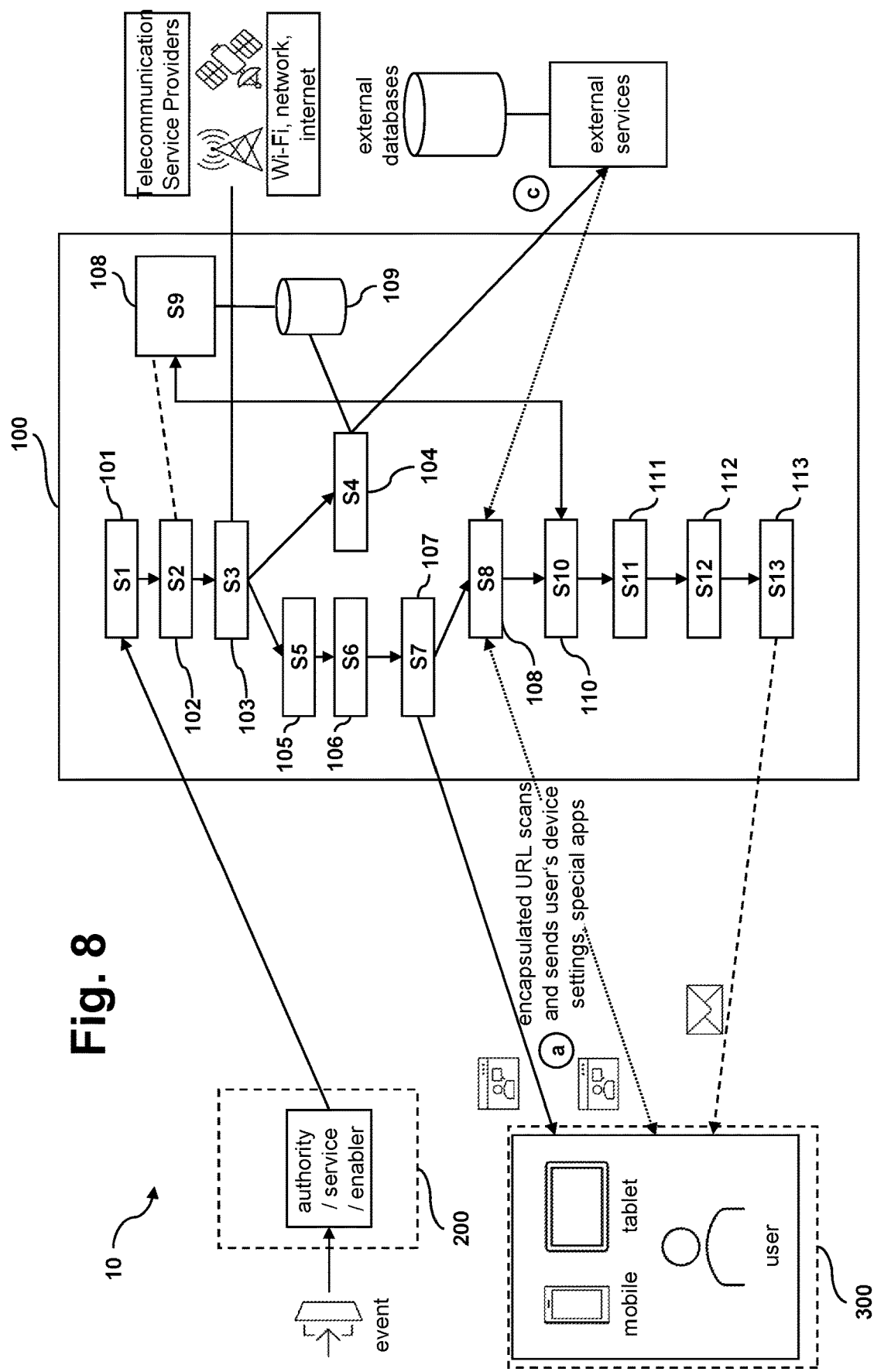
FIG. 8 shows a schematic illustration of the system and method steps regarding personalized messages type A and type B in an integrated view according to an embodiment of the invention.

In the case of personalized messages, the system can among others support two main types of messages. For the first type, hereafter called type A, the system utilizes all necessary information, creates the personalized message, and sends it to a specific user (FIG. 6). For the second type, hereafter called type B, the system retrieves information from the user's end device to create the personalized message by using a mechanism to discover the user's special needs based on installed apps and personal configuration settings (FIG. 7). An integrated view of type A and type B is shown in FIG. 8.

Type A will be explained in more detail in the following on the basis of FIG. 6 and using example of scenario A described at the beginning. Furthermore, reference signs of FIG. 1 are used (this also applies to FIGS. 7 to 10). Upon an emergency event, the system is triggered. Based on the location of the incident the system finds the group of users who should be informed. It retrieves data for each user so in the case of the user with low vision it will retrieve (if not from the system database, then by external resources) the user's detail and it will create a personalized message selecting the most adequate media type of each user. Then the personalized message will be sent to the user. In the case of the user with low vision, the user will receive a voice message. Otherwise, the user would have to proactively configure his/her device, i. e. installing or activating a screen-reader which could play the received text message aloud.

Type B will be explained, in more detail, in the following on the basis of FIG. 7 and using the example of scenario A described at the beginning. Upon an emergency event, the system is triggered. Based on the location of the incident the system finds the group of users who should be informed. It creates a URL which is included to the message send to each user. When the user receives the message, the URL triggers a scan to the user's device and sends information about the device settings and special apps (related to one or more special needs) on the device back to the system as described thoroughly in FIG. 2. In the case of the user with low vision, the system would retrieve information about the Accessibility settings activated on the user's mobile device or the use of screen readers on the user's laptop like, e. g. VoiceOver on Mac or Job Access With Speech (JAWS)/Non Visual Desktop Access (NVDA) on Windows. The system utilizing this information, creates a personalized message selecting the most adequate media type of each user and it sends it to the user's end device so it can be provided to the user. In the case of the user with low vision, the user will receive a voice message instead of a plain text. In case a user has cognitive disabilities, i. e. a neurodiverse person or a person having experienced a stroke with special need on interacting with content that is simple in syntax, not long sentences and avoidance of using metaphorical meanings, the system utilizing mechanisms of Artificial Intelligence (AI) and Natural Language Processing (NLP) could produce a message content (textual or not) which respects such requirements.

Figure 9:
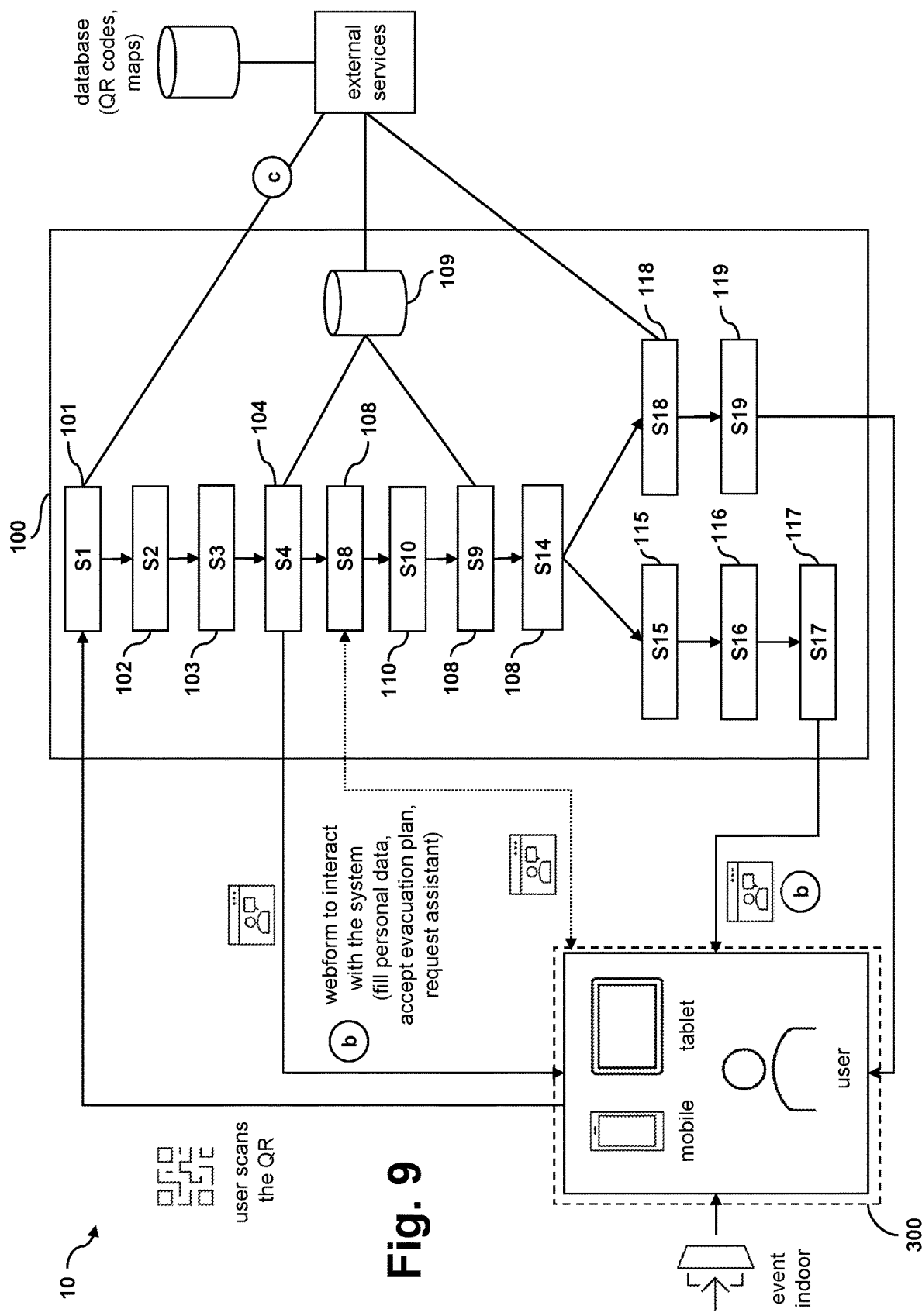
FIG. 9 shows a schematic illustration of the system and method steps regarding personalized indoor evacuation guidelines according to an embodiment of the invention.
Figure 10:
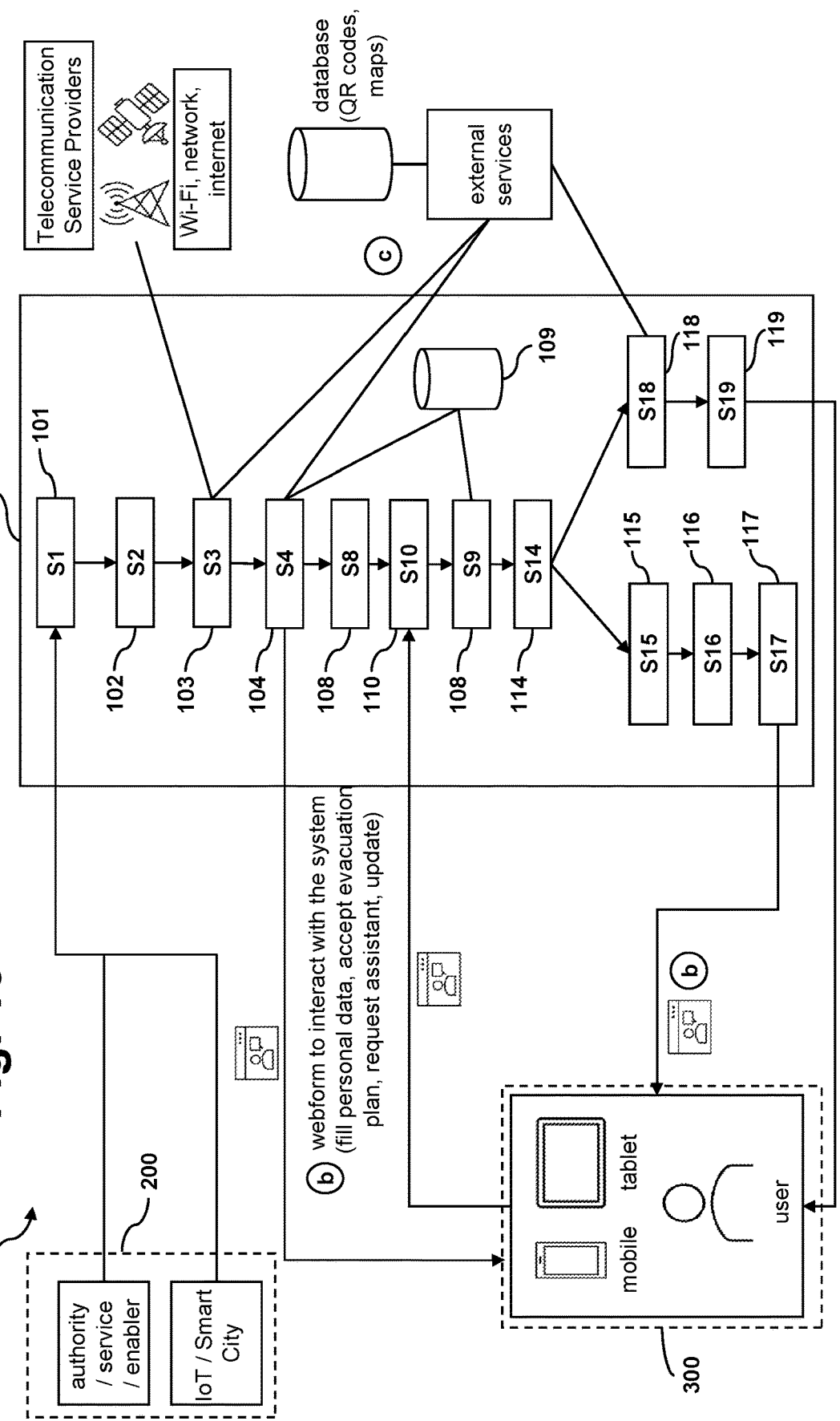
FIG. 10 shows a schematic illustration of the system and method steps regarding personalized outdoor evacuation guidelines according to an embodiment of the invention.

In the case of personalized evacuation guidelines, the system differentiates the cases of indoors (FIG. 9) and outdoors (FIG. 10). Indoor evacuation guidelines are explained in more detail below with reference to FIG. 9. In the case of indoors, it is considered that the building has maps hanged in various places on the wall and each map contains a QR (Quick Response) code (this is just one of many examples of a technology which could be used). The user scans the QR code of the map nearest to him/her. The system is triggered and after retrieving data about the building maps, the user's location, and user's data, it stores them locally and it calculates the personalized evacuation routes. Depending on the current conditions (i. e., fire on location X, user in a wheelchair needing to avoid staircases, etc.) the system chooses the best route, creates the personalized instructions and it sends them to the user. Otherwise, the user is also offered the option to request an assistant, in which case the system triggers the process of informing the assistant of the user in need to be reached out or another assistant and it also notifies the user of the help under way (FIG. 9). The following example, using scenario B from the beginning. describes indoor evacuation in more detail. Maria and John are in their office on the $2^{nd}$ floor at the right wing working when a fire starts in the same floor but at the opposite wing. The alarm is activated, and the people are alerted that they need to evacuate the building. John is in a wheelchair, and he cannot recall all the details of the last evacuation rehearsal some months ago. However, he does remember that a new option is available, and he just needs to reach the nearest exit map in his floor. John directs to the map nearest him which is 3 meters away. He scans the QR code shown on the map. The system is triggered and therefore, it is aware of the user's position and retrieves the user's data and the data map. In this case where John is in a wheelchair, it means that the system should consider the condition of avoiding the use of staircases. The system has information about the fire at the left wing of the building and taking into account all the information, it calculates the best route, creates the personalized evacuation route for John and sends these instructions to him. John now has the personalized instructions on his device and uses them to evacuate the building avoiding the area under fire. While John has safely reached to the $1^{st}$ floor, he receives a notification by the system with updated evacuation instructions as the fire has progressed and there are new areas to be avoided. Now John using the new instructions manages to safely exit the building. Maria also realizes the emergency of the situation, but she is frozen by anxiety. (The system, using the option to send personalized messages, sends her a message to inform her of the emergency and that she needs to evacuate the building.) Using the info on the message she moves to the nearest map and scans the QR code. The system gathers all necessary information, calculates, and sends her back the evacuation instructions. However, Maria is scared and utilizes the option to request an indoor assistant. The system triggers the process of picking a person to assist the user in need and then notifies Maria that help is under way. The assistant using the system's information finds Maria and using the updated evacuation instructions is able to exit the building safely.

Outdoor evacuation is explained in more detail below with reference to FIG. 10. The system according to this invention is notified about an emergency incident outdoors (i. e. smoke clouds are detected in air images in the park on the left outskirts of the city, or sensors for smoke inside the park are triggered, etc.). The system retrieves the maps related to the area under emergency and finds the impacted users in the area using information from Telecommunication Service Providers (TSPs). The system requests data for the user by reaching out to each impacted user and by retrieving data from databases (internally and/or externally). The impacted user can optionally fill in a webform with personal data and he/she has the option to even request for assistance via use of the user's end device (e.g. laptop computer, smart phone, tablet, etc.). Upon receiving the data, the system stores them locally and it calculates the personalized evacuation routes. Depending on the current conditions (i. e. fire on location X, etc.) the system chooses the best route, creates the personalized instructions and it sends them to the user. In case the user has asked for an assistant, the system activates the mechanism of picking an assistant, sending information about the user under emergency and informs the user that help is under way (FIG. 10). The following example, using scenario C from the beginning, describes outdoor evacuation in more detail. Alexandra is on the outskirts of the town in a large park enjoying a relaxing trekking activity when she sees clouds of smoke filling the air but not being able to specify how far away or near to her the fire is. She just realizes that she needs to evacuate the park immediately by avoiding the fire. She receives a message being notified for the emergency in her mobile phone where she is asked to fill in her personal data and she can accept an evacuation plan. The system upon being triggered has identified the users under emergency in the park and using information by the Telecommunication Service Providers (TSPs) sends a message containing a webform to each user. Using this information and the location of the fire, it calculates the personalized evacuation guidelines and sends them back to Alexandra. Alexandra follows her personalized guidelines to evacuate the park. While she is moving away, she receives updated evacuation routes after the system has taken into account the expansion of the fire and recalculating a safe exit plan. Using the updated instructions, she safely reaches a destination where medical staff can take a look at her and be taken care of.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for automated personalized messages and personalized evacuation guidelines indoors or outdoors, said method being implemented by an internal system of a system further comprising an inbound system and an outbound system, the internal system comprising one or more processors operably coupled to a non-transitory computer readable storage medium, said method comprising:
    validating, by an event listener, a message about an event received from an enabler;
    processing, by an event parser, a forwarded message from the event listener;
    locating, by a request map component, users in an area of the event and retrieving maps that will be used to assist the users through a triggered action by the event parser;
    requesting, by a request user data component, user data either from a database of an external service or directly from an end device of the user by a create Uniform Resource Locator (URL) component;
    creating, by the create URL component, an URL which incorporates a method to deploy a software application on the user's end device for retrieving user data from the user's end device, by scanning the user's end device, said user data comprising a list of the installed applications in the user's end device and data related to user's needs, said user's needs comprising user's physical and/or cognitive impairments;
    encapsulating, by an enhanced message URL component, the created URL to the forwarded message, an enhanced message being obtained, and forwarding the enhanced message to a forward message and an encapsule URL component;
    forwarding, by the forward message and the encapsule URL component, the enhanced message to the outbound system comprising the user's end devices;
    generating and maintaining, by an app server service component, a data exchange between the system and the user's end device upon triggering by the enhanced message on the user's end device;
    storing, by the app server service component, received user data and/or user location data into the database and triggering data analysis by a data analysis component;
    performing, by the data analysis component, data mining techniques to retrieve all available stored data regarding the user's location, indoor/outdoor maps, the user's data and/or event information, and applying clustering, regression and/or classification methods based on machine learning algorithms to the retrieved data to categorize the user into user's labels according to the user's needs, deploy evacuation models; and select an evacuation model which fits best the user's needs;
    generating, by a calculate personalized message component, an enhanced personalized message for the user regarding results of the data analysis and event data;
    selecting, by a select message media type component, a suitable message media type according to the user's needs;
    sending, by the personalized message component, the enhanced personalized message to the user upon triggering by the select message media type component;
    calculating, by a calculate personalized evacuation routes component, personalized evacuation routes based on the results of the data analysis comprising the user's labels and/or external data;

choosing, by a choose best route per conditions component, an evacuation path for the user among available evacuation paths based at least on the user's needs and on risk grades associated with the available evacuation paths, that minimizes a risk for the user to get harmed;
creating, by a create personalized instructions component, appropriate evacuation instructions for the user regarding results of the choosing of the evacuation path;
sending, by a send personalized instructions component, the appropriate evacuation instructions to the user's end device upon triggering by the select message media type component.

2. The method according to claim 1, further comprising providing, by a request assistance component, a web interface to request assistance by the user and forwarding the request for assistance to an external service.

3. The method according to claim 2, further comprising sending, by a notify user component, a notification to the user about progress of the request for assistance upon triggering by the request assistance component.

4. The method of claim 1, wherein the generating, by the calculate personalized message component, the enhanced personalized message for the user regarding the results of the data analysis and the event data comprises:
retrieving the user data and the event data;
identifying and classifying data regarding the user's needs using algorithms based on machine learning techniques;
generating appropriate evacuation instructions optimized for the user's needs using a natural language processing (NLP) algorithm;
creating the enhanced personalized message, comprising the appropriate evacuation instructions along with a URL allowing the user to interact with the system; and
triggering the select message media type component.

5. The method of claim 1, wherein the calculating, by the calculate personalized evacuation routes component, the personalized evacuation routes regarding the results of the data analysis and/or external data comprises:
retrieving user's and event data;
identifying that there is no ongoing or new evacuation request from the user,
determining that the user has not made a request for assistance;
triggering a request assistance component;
calculating a deviation of the user's location from an already proposed evacuation route;
determining that the calculated deviation does not exceed a predefined threshold; and
updating available evacuation routes by the system and triggering the create personalized instructions component.

6. The method of claim 1, wherein after receiving, by the user's end device the enhanced message, the method further comprising:
determining that silent software application installation is permitted by the user's end device policies;
activating, the URL and deploying the software application which implements a Package Manager/Query-Application Programming Interface (API) Package-like class in order to retrieve various kinds of information related to application packages that have been installed on the users' end device and settings and opening a communication between the user's end device and the app server service component;
scanning, by the software application the user's end device;
collecting data related to, all applications that have been installed by the user as well as the configured end device settings and aggregating the collected data;
sending the aggregated data to the app server service component; and
deactivating the URL and terminating the communication with the app server service component.

7. The method according to claim 1, further comprising determining that silent software installation is not permitted;
building and serving, by the app server service component, a web-based application providing an ability to the user to add more information related to the user's needs or profile voluntarily.

8. The method of claim 1, wherein the enabler comprises one of a smart device, an Internet of Thing, IoT, device, or a Quick Response, QR, code detector.

9. The method of claim 1, further comprising:
calculating a deviation of the user's location from an already proposed evacuation route;
determining that the calculated deviation is above the predefined threshold or that there is a new evacuation request;
calculating all available evacuation routes;
executing an evacuation and risk assessment to grade a risk of the available routes using artificial intelligence and predictive algorithms;
filtering out overcrowded and unsuited routes using rule-based algorithms, filtered evacuation routes being obtained; and
forwarding the filtered evacuation routes to the choose best route per conditions component to trigger choosing an evacuation path for the user with a minimized risk to get harmed.

10. The method of claim 1, further comprising identifying that there is ongoing or new evacuation request from the user, determining that the user has made a request for assistance, and triggering a request assistance component.

11. A system for automated personalized messages and personalized evacuation guidelines indoors or outdoors, the system comprising an internal system, an inbound system, and an outbound system, wherein the internal system comprises one or more processors operably coupled to a non-transitory computer-readable storage device, the one or more processors are configured to provide:
an event listener configured to validate a message about an event received from an enabler;
an event parser configured to process a forwarded message from the event listener;
a request map component configured to locate users in an area of the event and retrieve maps that will be used to assist the users through a triggered action by the event parser;
a request user data component configured to request user data either from a database of an external service or directly from a user's end device by a create Uniform Resource Locator (URL) component;
the create URL component configured to create a URL that incorporates a method to deploy a software application on the user's end device for retrieving user data from the user's end device by scanning the user's end device, said user data comprising a list of the installed applications in the user's end device and data related to user's needs, said user's needs comprising user's physical and/or cognitive impairments;
an enhanced message URL component configured to encapsulate the created URL to the forwarded message, an enhanced message being obtained, and forward the enhanced message to a forward message and an encapsulate URL component;

the forward message and the encapsulate URL component configured to forward the enhanced message to the outbound system comprising the user's end device;

an app server service component configured to generate and maintain a data exchange between the system and the user's end device upon triggering by the enhanced message on the user's end device;

the app server service component configured to receive user data and/or user location data into the database and trigger data analysis by a data analysis component;

the data analysis component configured to perform data mining techniques to retrieve all available stored data regarding the user's location, indoor/outdoor maps, the user's data comprising the user's needs and/or event information and applying machine learning algorithms to the retrieved data to categorize the user into user's labels according to the user's needs, deploy evacuation models and select an evacuation model which fits best the user's needs;

a calculate personalized message component configured to calculate an enhanced personalized message for the user regarding results of the data analysis and event data;

a select message media type component configured to select a suitable message media type according to the user's needs;

the personalized message component configured to send the enhanced personalized message to the user upon triggering by the select message media type component;

a calculate personalized evacuation routes component configured to calculate personalized evacuation routes based on the results of data analysis comprising the user's labels and/or external data;

choose best route per conditions component configured to choose an evacuation path for the user among available evacuation paths based at least on the user needs and on risk grades associated with the available evacuation paths, that minimizes a risk for the user to get harmed;

a create personalized instructions component configured to create appropriate evacuation instructions for the user regarding results of the choosing of the evacuation path; and a send personalized instructions component configured to send the appropriate evacuation instructions to the user's end device upon triggering by the select message media type component.

12. The system of claim 11, wherein the inbound system and/or the outbound system further comprise at least one of one or more enabler, one or more user end device, one or more Telecommunication Service Provider (TSP) one or more external services, or one or more authorities or services able to transmit different events and/or one or more external database.

* * * * *